UNITED STATES PATENT OFFICE 2,643,244

EPICHLORHYDRIN-SULFONAMIDE RESINS

John Kenson Simons, Toledo, Ohio, assignor to Libbey-Owens-Ford Glass Company, Toledo, Ohio, a corporation of Ohio No Drawing. Application April 16, 1948,
Serial No. 21,563

12 Claims. (Cl. 260—49)

The invention relates to the production of synthetic resins and more particularly to the production of novel synthetic resins from epichlorohydrin.

In order for a resin to be formed by the reaction of two substances, it is necessary that the molecule of each substance have at least two reactive points. When the two molecules react with each other at two points on each molecule, the reaction product is a chain molecule in which the residues from each of the reacting molecules appear in alternate succession along the chain. The elongated chain-like structure of the molecules of the reaction product causes the reaction product to be resinous in character.

The principal object of the invention is the production of novel synthetic resins from epichlorohydrin. More specific objects and advantages are apparent from the description, which discloses and illustrates but is not intended to limit the scope of the invention.

Epichlorohydrin has an epoxy group at one end of the molecule and a chloro group at the other end of the molecule. It is known that the epicholorhydrin molecule reacts at two points with a dihydric phenol molecule to produce a synthetic resin.

An unsubstituted sulfonamide contains an $NH_2$ group connected to an $SO_2$ group. The reactivity of the two hydrogen atoms in an $NH_2$ group is not necessarily the same, and it is often more difficult to replace the second hydrogen atom in an $NH_2$ group than it is to replace the first hydrogen atom. Moreover, the reactivity of the two possible reactive groups in the epichlorohydrin molecule is not necessarily the same. When only one hydrogen atom in a sulfonamide molecule reacts with epichlorohydrin, the product is a monomeric substance rather than a synthetic resin beacuse the largest molecule that can be produced by such a reaction is a molecule formed from one molecule of epichlorohydrin and two molecules of the sulfonamide. When only one reactive group in the epichlorohydrin molecule reacts with a sulfonamide, the product is likewise a monomeric substance. The present invention is based upon the discovery that it is possible to react a second reactive group in the epichlorohydrin molecule with a second hydrogen atom in a sulfonamide group, to produce a synthetic resin.

A method of producing a synthetic resin, embodying the invention, comprises the step of reacting epichlorohydrin with a sulfonamide whose molecule has at least two hydrogen atoms each connected to a sulfonamide nitrogen atom.

In general, the synthetic resins of the invention are thermoplastic in nature. They are produced by means of a reaction between epichlorohydrin and a sulfonamide. Such a reaction can be conducted between epichlorohydrin and a sulfonamide alone, or in the presence of a second compound which reacts with epichlorohydrin. It is believed that the significant reaction which occurs between these compounds in the practice of the invention is between hydrogen and the epoxy group (i. e., the group

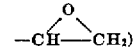)

and that a secondary alcohol is formed as a product of this reaction. Compounds that are useful in the practice of the invention in that they undergo this reaction with the epoxy group can be represented by the formula H—A, in which A is the residue that would be formed by removal of a hydrogen from a sulfonamide, a dihydric phenol or a dimercaptan (i. e., H—A represents a sulfonamide, a dihydric phenol or a dimercaptan). The reaction which is believed to occur between the epoxy group of epichlorohydrin and a compound having the general formula H—A is shown in Equation 1, below:

(1) 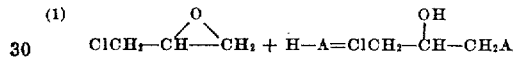

It has been found that the product of a reaction corresponding to Equation 1, when treated with a strong base, yields a compound containing an epoxy group; this reaction is believed to proceed according to Equation 2, below:

(2) 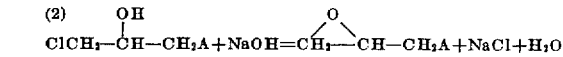

The epoxy compound produced by a reaction corresponding to Equation 2 can then be reacted with a substance having the formula H—A'; it is believed that the epoxy group undergoes a reaction similar to that represented in Equation 1 to produce a compound having a general formula corresponding to Formula 3, below:

(3) 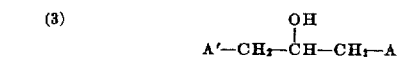

Useful resins are produced by conducting such reactions between sufonamides and epichlorohydrin alone. Because the sulfonamides used in the practice of the invention have at least two hydrogen atoms which will react with the epoxy group of epichlorohydrin, such reactions produce long chain molecules comprised of repeating units having the formula

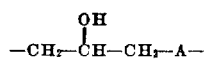

It is sometimes desirable to produce modified resins by conducting such a reaction between epichlorohydrin and a mixture composed of sulfonamides and one or more of the other substances represented by the formula H—A, hereinbefore described. Useful modified resins of the invention can be produced in this way when the mixture of sulfonamides and other substances represented by the formula H—A comprises from about 50 mol per cent of sulfonamides to about 95 mol per cent of sulfonamides. As is indicated by Formula 3, above, each molecule of the resins of the invention is made up, in part, of secondary carbon atoms to which are attached hydroxyl groups. These resins can be modified by means of a reaction which involves the hydroxyl groups.

Modifying the resins by esterifying reactive OH groups results in particularly useful compositions. For example, in some instances it is possible to produce air-drying resins by reacting an epichlorohydrin-sulfonamide resin with linseed oil acids, or mixtures of eleostearic acid and other less unsaturated acids. The epichlorohydrin-sulfonamide resins can also be modified by means of a reaction with phthalic acid or phthalic anhydride or with other saturated or unsaturated dicarboxylic acids such as maleic acid, itaconic acid, citraconic acid, oxalic acid and adipic acid, or other substances such as acetic anhydride, isocyanates, di-isocyanates and the like.

The resins of the invention can also be modified by means of an agent that will react with residual epoxy groups. Such reagents include amines, preferably diamines. The most desirable are aliphatic amines such as triethylenetetramine, diethylenetriamine and hexamethylenediamine.

The sulfonamides that are reacted with epichlorohydrin in the practice of the invention to produce a synthetic resin may have the general formula

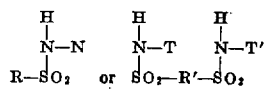

in which R is a monovalent aromatic or aliphatic or cycloaliphatic hydrocarbon radical; each of the radicals T and T' is hydrogen or a monovalent aromatic or aliphatic radical; and R' is a divalent aromatic or aliphatic or cycloaliphatic hydrocarbon radical.

Thus, in the case of monosulfonamide:

the reaction is believed to proceed according to Equations 4, 5 and 6, below:

(4)
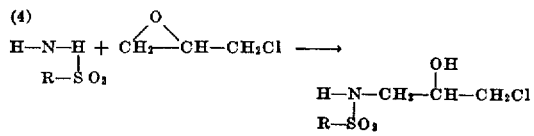

(5)
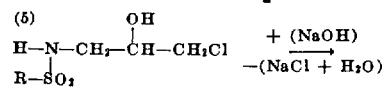

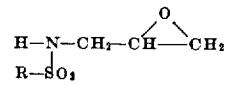

(6)
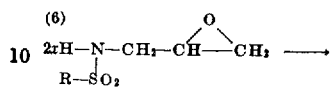

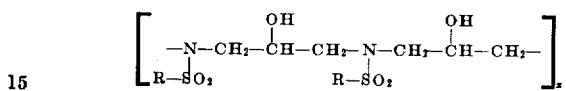

wherein $x$ is one-half the number of units in a molecule of the final condensation polymer.

In the case of a disulfonamide:

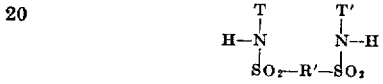

the reaction is believed to proceed according to Equations 7, 8 and 9, below:

(7)
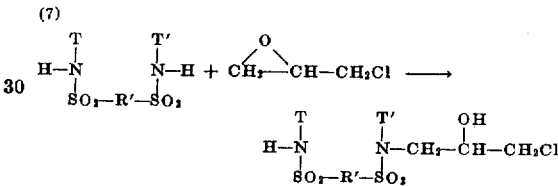

(8)
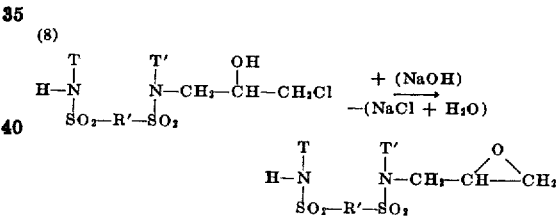

(9)
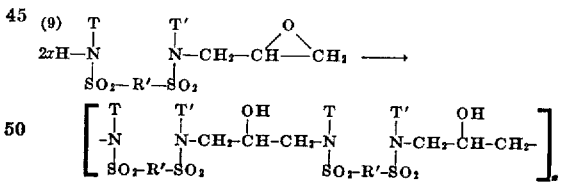

wherein $x$ is one-half the number of units in a molecule of the final condensation product.

It is, therefore, apparent that the molecular chain structure of the epichlorohydrin-sulfonamide condensation polymer of the invention is characterized by the fact that the epichlorohydrin constituent has the formula

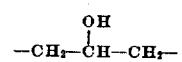

and forms a bridge in the polymer chain directly connecting two sulfonamide nitrogen atoms by replacement of a hydrogen atom on each of such nitrogen atoms, there being at least two such replaceable hydrogen atoms in each sulfonamide molecule. Of course, if one mol of epichlorohydrin is used for every hydrogen atom connected to a sulfonamide nitrogen atom, then the foregoing epichlorohydrin constituent replaces at least two such hydrogen atoms in each sulfonamide molecule. In the case of the monosulfonamide, the polymer chain (as shown in Equation 6) consists in recurring units having the formula

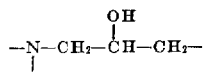

In the case of the disulfonamide, the polymer chain (as shown in Equation 9) comprises recurring units having the formula

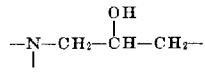

but is characterized more particularly by the fact that each of the two sulfonyl radicals of a disulfonamide residue is connected directly to a sulfonyl radical in another disulfonamide residue by a radical having the formula

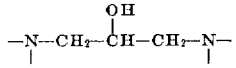

In the case of either sulfonamide (i. e., monosulfonamide or disulfonamide) the reaction is characterized by incorporation of an epichlorohydrin constituent in a polymer chain by conversion of the epichlorohydrin molecule to a divalent bridge between two sulfonamide nitrogen atoms as represented by Equation 10 below:

(10)

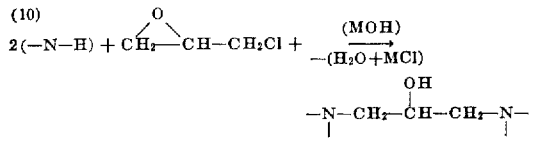

wherein each

consists of a sulfonamide nitrogen atom (of a different sulfonamide molecule) having connected thereto a hydrogen atom, MOH is a base and MCl is a salt obtained by neutralization of MOH with HCl. It can thus be seen that the chemical change undergone by the principal reactants involved in the reaction of the invention is the resin-forming reaction of epichlorohydrin at a sulfamine radical (e. g.,

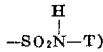

in the sulfonamide, or simply the conversion of the epichlorohydrin molecule to a polymer chain constituent by replacing hydrogen atoms on sulfonamide nitrogen atoms, as shown in Equation 10.

R (or R') may be a monovalent (or divalent) radical which can be considered to be derived (by the removal of one or two hydrogens) from the molecule of a straight or branched chain, saturated or unsaturated aliphatic hydrocarbon. The monovalent radical R may be derived (by removal of any hydrogen) from a hydrocarbon having from 1 to 18 carbon atoms. Thus, R may be derived from methane, ethane, ethylene, propane, propene, either butane, any butene, or any alkane or unsaturated aliphatic hydrocarbon having from 5 to 18 carbon atoms. R' may be derived (by removal of two hydrogens) from a hydrocarbon having from 3 to 18 carbon atoms, i. e., may be derived from any of the hydrocarbons last described except methane, ethane or ethylene. The two free valences of the radical R' are not attached to the same carbon atom or to adjacent carbon atoms.

R (or R') also may be a monovalent (or divalent) radical which can be considered to be derived (by the removal of one or two hydrogens), from the molecule of a cycloalkane. R may be derived (by removal of any hydrogen) from cyclopentane, cyclohexane or an alkylated cyclopentane or cyclohexane, or a derivative of cyclopentane or cyclohexane in which two carbon atoms in the ring of cyclopentane, cyclohexane or an alkylated cyclopentane or cyclohexane are common to the ring of another such cycloalkane. When R is such a radical that it can be considered to be derived from an alkylated cyclopentane or cyclohexane, the alkyl radicals on each ring may be methyl or ethyl and may be from one to two in number. In a radical R', derived by the removal of two hydrogens from the molecule of a cycloalkane, the free valences are not attached to the same carbon atom, or to adjacent carbon atoms in an alkyl side chain.

R (or R') also may be a monovalent (or divalent) radical derived (by the removal of one or two hydrogens) from the molecule of an aromatic hydrocarbon. When R or R' is derived from an aromatic hydrocarbon it is usually economically desirable that it be derived from benzene, naphthalene, an alkylated benzene or an alkylated naphthalene. When R or R' is derived from a mono-alkyl benzene it is usually not advantageous that the alkyl group have more than 18 carbon atoms. Also it is desirable that the alkylated benzene have no more than four alkyl groups; or, if more than one alkyl group, that the total number of carbon atoms in each molecule of the alkylated benzene not exceed 14. When the alkylated benzene has from two to four alkyl groups it may have a total of from 8 to 14 carbon atoms (i. e., all the alkyl groups may contain a total of from 2 to 8 carbon atoms); the alkyl groups may be any combination of from two to four alkyls so long as the total number of carbon atoms in these groups does not exceed 8. Each alkyl group may be in any position (i. e., attached to any nuclear carbon atom). When R or R' is derived from an alkylated naphthalene it may have from one to two alkyl radicals each of which is methyl or ethyl. Each methyl or ethyl radical may be bonded to any nuclear carbon atom that is not attached to a sulfonamide group. If a sulfonamide group is attached to a carbon atom in one of the side chains of an alkylated benzene or an alkylated naphthalene, no adjacent carbon atom in that side chain should be attached to another sulfonamide group, and not more than one sulfonamide group should be attached to any one carbon atom in a side chain.

R (or R') also may be a monovalent (or divalent) radical derived from an ether. The ether from which R or R' is derived may be a dialkyl ether, a dialkyl ether of ethylene glycol, a diaryl ether or an ankyl-aryl diether. Each alkyl radical of the dialkyl ether or the dialkyl ether of ethylene glycol may have from two to four carbon atoms. Each aryl group of the diaryl ether or alkyl-aryl ether may be phenyl or an alkyl phenyl radical. When the aryl group is an alkyl phenyl radical it may have one or two side chains each of which consists of an alkyl radical having one or two carbon atoms. The alkyl radical of the alkyl-aryl ether is one having from one to five carbon atoms. It is much easier to prepare a sulfonamide in which sulfur is attached to the aromatic group of such an ether, so this type of sulfonamide is preferable (for economic reasons) to that in which the sulfonamide group is attached to the alkyl group in such an ether.

R or R' also may be derived from an ether of the general type E—O(—t—O)ₙ—E' in which n is an integer from 1 to 3, t is any alkylene radical having from 2 to 18 carbon atoms and each of the radicals E and E' is an aryl radical having one or two benzene nuclei (i. e., phenyl, naphthyl or biphenyl).

R or R' may be derived from biphenyl, from diphenyl methane or from 1,2-diphenyl ethane.

In order that the reaction of the invention may produce resins having a comparatively high molecular weight it is desirable that the material having the formula H—A, hereinbefore described, have at least two reactive points (i. e., have at least two hydrogens that are capable of reacting with epichlorohydrin). Hydrogen atoms that are bonded to the nitrogen atom of the sulfonamide group react with epichlorohydrin. Therefore, in order to produce high molecular weight resins the sulfonamide should have at least two hydrogen atoms that are connected to a sulfonamide nitrogen atom. When epichlorohydrin is reacted with a monosulfonamide both the hydrogen atoms in the sulfonamide group should react with the epichlorohydrin in order to produce a synthetic resin. However, epichlorohydrin may be reacted with a disulfonamide in which one or two of the hydrogen atoms of the sulfonamide groups have been replaced by organic radicals. Both hydrogens in one sulfonamide group may be replaced; one hydrogen in each sulfonamide group may be replaced; or one hydrogen in either sulfonamide group may be replaced. A monovalent radical (the radical T, hereinbefore described) is substituted for each sulfonamide hydrogen replaced. T can be considered to be derived by the removal of one hydrogen from the molecule of a straight or branched chain, saturated or unsaturated aliphatic hydrocarbon such as methane, ethane, propane, propene, either butane, any butene, or any alkane or unsaturated aliphatic hydrocarbon having from 5 to 18 carbon atoms. The monovalent radical which replaces hydrogen also may be one derived by the removal of one hydrogen from an aromatic hydrocarbon such as benzene, naphthalene, an alkylated benzene or an alkylated naphthalene. An alkylated benzene from which T is derived may have from one to four alkyl radicals, no one of which has more than 18 carbon atoms; if there are two or more alkyl radicals, the total number of carbon atoms in each alkyl benzene is from 8 to 14 (i. e., all the alkyl substituents contain a total of from 2 to 8 carbon atoms) as hereinbefore described. When the aryl radical is derived from an alkylated naphthalene it may have from one to two alkyl radicals, each of which is methyl or ethyl, as hereinbefore described.

A sulfonamide having the general formula

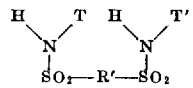

(in which one or two sulfonamide hydrogens have been replaced by an aromatic or aliphatic radical) can be prepared by means of a reaction between a disulfonyl chloride and an amine or mixture of amines having the general formula T—NH₂ or T—NH₂ and T'—NH₂. In order to demonstrate the procedure by which such a reaction may be conducted the following method is described:

Diphenyl ether disulfonyl chloride (a total of 110 grams) is added in about 20 gram portions to stirred butyl amine (88 grams). Benzene is added as needed to keep the reaction mixture sufficiently fluid that it can be stirred readily. When all the diphenyl ether disulfonyl chloride has been added to the butyl amine the mixture is held, with stirring, at about 50° C. for about 30 minutes. The mixture is then cooled; water is added; and the solids are separated by filtration. Pure N,N'-di-n-butyl diphenyl ether disulfonamide (83 grams: melting point, 145–146° C.) is obtained by crystallization from a benzene solution. An analogous procedure using 78 grams of allyl amine and 110 grams of diphenyl ether disulfonyl chloride yields 37 grams of N,N'-diallyl diphenyl ether disulfonamine (melting point 130–133° C.).

An advantageous embodiment of the invention comprises reacting with epichlorohydrin a disulfonamide having at least one hydrogen atom attached to each of the nitrogen atoms in the sulfonamide groups. The two sulfonamide groups and the hydrocarbon radical to which they are bonded are believed to form a part of the molecular chain of the resin resulting from reaction between such a sulfonamide and epichlorohydrin. This type of molecular structure is contrasted with that believed to result when epichlorohydrin reacts with the two hydrogen atoms in a single sulfonamide group, in which only the nitrogen atom of one sulfonamide group is thought to be a part of the molecular chain of the resin, the rest of the molecule of the sulfonamide starting material appearing as a side chain bonded to this nitrogen atom. By producing resins whose molecular structures are combinations of these two types it is possible further to modify the characteristics of the resins of the invention.

A preferred starting material is N,N'-di-n-butyl diphenyl ether 4,4'-disulfonamide.

Examples of sulfonamides that may be reacted with epichlorohydrin in the practice of the invention include 4-methyl-4'-biphenyl sulfonamide, N,N'-di-n-butyl diphenyl ether disulfonamide, p-toluene sulfonamide, benzene sulfonamide, diethyl ether disulfonamide, m-benzene disulfonamide, 4,4'-diphenyl ether disulfonamide, 4,4'-diphenoxy ethane disulfonamide, 4,4'-(alpha,beta-diphenoxy propane) disulfonamide, 4,4'-(beta,beta'-diphenoxy ethyl ether) disulfonamide, N,N'-diallyl diphenyl ether disulfonamide, ethane sulfonamide, propane sulfonamide, n-butane sulfonamide, isobutane sulfonamide, 1,5-pentane disulfonamide, cyclohexane sulfonamide, 1,4-cyclohexane disulfonamide, 4-methyl-1,3-benzene disulfonamide, diphenoxy diethylene glycol disulfonamides, 2,3-dimethyl benzene disulfonamide, 1,4-naphthalene disulfonamide, 2,6-naphthalene disulfonamide, 2,7-naphthalene disulfonamide, 1-naphthalene sulfonamide, 2-naphthalene sulfonamide, 2-biphenyl sulfonamide, 4-biphenyl sulfonamide, 4,4'-biphenyl disulfonamide, diphenoxy triethylene glycol disulfonamides, 1-methoxy-2,4-benzene disulfonamide and 1-ethoxy-2,4-benzene disulfonamide.

Sulfonamides are usually prepared by means of a reaction between ammonia and a sulfonyl chloride. The procedure by which this reaction is conducted is illustrated by the following: 2,2-diphenoxyethyl ether - 4,4' - disulfonyl chloride (26 grams) is dissolved in chloroform (250 ml.) and ammonium hydroxide (100 ml. of 28 weight per cent aqueous solution) is added to this solution, with stirring. The sulfonamide precipitates during the course of the 30-minute reaction, and is separated by filtration. Pure 2,2-diphenoxyethyl ether-4,4'-disulfonamide is obtained by dissolving the crude product in about 100 ml. of about 10 weight per cent sodium hydroxide and reprecipitating it by making the solution slightly acid with aqueous hydrochloric acid. Numerous other sulfonyl chlorides can be used to produce sulfonamides by means of this reaction, including (A monosulfonyl chlorides derived from benzene or an alkyl-substituted benzene such as 2-methylbenzenesulfonyl chloride, 3-methylbenzenesulfonyl chloride, 4-methylbenzenesulfonyl chloride, 2-ethylbenzenesulfony chloride, 3-ethylbenzenesulfonyl chloride, 4-ethylbenzenesulfonyl chloride, 3-n-propylbenzenesulfonyl chloride, 4-n-propylbenzenesulfonyl chloride, 4-isopropylbenzenesulfonyl chloride, 4-sec-butylbenzenesulfonyl chloride, 4-tert-butylbenzenesulfonyl chloride, 4-(1-pentyl)-benzenesulfonyl chloride, 4-(2 - pentyl)benzenesulfonyl chloride, 4 - (3-pentyl)benzenesulfonyl chloride, 4-neopentylbenzenesulfonyl chloride, 2,3-dimethylbenzenesulfonyl chloride, 3,4-dimethylbenzenesulfonyl chloride, 2,6-dimethylbenzenesulfonyl chloride, 2,4-dimethylbenzenesulfonyl chloride, 3,5-dimethylbenzenesulfonyl chloride, 2,5-dimethylbenzenesulfonyl chloride, 2-methyl-5-ethylbenzenesulfonyl chloride, 2-methyl-4-n-propylbenzenesulfonyl chloride, 2-methyl-5-n-propylbenzenesulfonyl chloride, 5-methyl-2-n-propylbenzenesulfonyl chloride, 3-methyl-4-isopropylbenzenesulfonyl chloride, 4-methyl-3-isopropylbenzensulfonyl chloride, 4-methyl-2-isopropylbenzenesulfonyl chloride, 2-methyl-4-isopropylbenzenesulfonyl chloride, 2-methyl-5-isopropylbenzenesulfonyl chloride, 5-methyl-2-isopropylbenzensulfonyl chloride, 2-methyl-4-tert-butylbenzenesulfonyl chloride, 2-methyl-5-sec-butylbenzensulfonyl chloride, 2-methyl-5-n-butylbenzenesulfonyl chloride 2-methyl-4-sec-butylbenzenesulfonyl chloride, 3,4-diethylbenzenesulfonyl chloride, 2,4-diethylbenzenesulfonyl chloride, 2,5-diethylbenzenesulfonyl chloride, 2-ethyl-5-n-propylbenzenesufonyl chloride, 2-ethyl-5-isopropylbenzenesulfonyl chloride, 2,3,4-trimethylbenzenesulfonyl chloride, 2,3,6 - trimethylbenzenesulfonyl chloride, 2,4,5-trimethybenzenesulfonyl chloride, 2,3,5 - trimethybenzenesulfonyl chloride, 2,4,6-trimethylbenzenesulfonyl chloride, 4,5 - dimethyl - 2 - ethylbenzenesulfonyl chloride, 3,6 - dimethyl - 2 - ethylbenzenesulfonyl chloride, 2,4 - dimethyl - 5 - ethylbenzenesulfonyl chloride, 2,6 - dimethyl - 4 - ethylbenzenesulfonyl chloride, 2,4 - dimethyl - 6 - ethylbenzenesulfonyl chloride, 2,3,4,5 - tetramethylbenzenesulfonyl chloride, 2,3,4,6 - tetramethylbenzenesulfonyl chloride and 2,3,5,6-tetramethylbenzenesulfonyl chloride.

Sulfonamides can also be produced by means of such a reaction using (B) disulfonyl chlorides derived from benzene such as benzene-1,2-disulfonyl chloride, benzene-1,3-disulfonyl chloride, benzene-1,4-disulfonyl chloride, 4-ethylbenzene-1,3-disulfonyl chloride, 4-methylbenzene-1,2-disulfonyl chloride, 2-methylbenzene-1,3-disulfonyl chloride, 4-methylbenzene-1,3-disulfonyl chloride, 5-methylbenzene-1,3-disulfonyl chloride, 2-methylbenzene-1,4-disulfonyl chloride, 1,2 - dimethylbenzene - 3,5 - disulfonyl chloride, 1,3 - dimethylbenzene - 4,6 - disulfonyl chloride, 1,3 - dimethylbenzene - 2,4 - disulfonyl chloride, 1,4 - dimethylbenzene - 2,5 - disulfonyl chloride, 1,4 - dimethylbenzene - 2,6 - disulfonyl chloride, 1,4 - dimethylbenzene - 2,3 - disulfonyl chloride, 1,3,5 - trimethylbenzene - 2,4 - disulfonyl chloride, biphenyl - 2,2' - disulfonyl chloride, biphenyl - 3,3' - disulfonyl chloride, 4,4'-dimethyl - biphenyl - 2,2' - disulfonyl chloride, 5,5' - dimethyl-biphenyl - 2,2' - disulfonyl chloride and diphenylmethane-4,4' disulfonyl chloride.

Monosulfonyl chlorides derived from naphthalene can also be used to produce sulfonamides by means of a similar reaction. Such sulfonyl chlorides include (C) 1-methylnaphthalene-3-sulfonyl chloride, 1-methylnaphthalene-4-sulfonyl chloride, 1-methylnaphthalene-5-sulfonyl chloride, 1-methylnaphthalene-6-sulfonyl chloride, 1-methylnaphthalene-7-sulfonyl chloride, 2-methylnaphthalene-1-sulfonyl chloride, 2-methylnaphthalene - 6 - sulfonyl chloride, 2-methylnaphthalene-8-sulfonyl chloride, 2-ethylnaphthalene-6-sulfonyl chloride, 2-isopropylnaphthalene-1-sulfonyl chloride, 1-benzylnaphthalene-4-sulfonyl chloride, 1,6-dimethylnaphthalene-4-sulfonyl chloride, 6,7-dimethylnaphthalene-1-sulfonyl chloride, 2,6-dimethylnaphthalene-1-sulfonyl chloride, 2,6-dimethylnaphthalene-7-sulfonyl chloride, 2,6-dimethylnaphthalene-8-sulfonyl chloride and 2,7-dimethylnaphthalene-3-sulfonyl chloride.

Disulfonyl chlorides derived from naphthalene can also be used. Such sulfonyl chlorides include (D) naphthalene-1,3-disulfonyl chloride, naphthalene - 1,4 - disulfonyl chloride, naphthalene-1,5-disulfonyl chloride, naphthalene - 1,6 - disulfonyl chloride, naphthalene - 1,7 - disulfonyl chloride, naphthalene - 2,6 - disulfonyl chloride and naphthalene - 2,7 - disulfonyl chloride.

Other sulfonyl chlorides that can be used include (E) monosulfonyl chlorides derived from aryl-alkyl ethers such as 4-phenoxybenzene-1-sulfonyl chloride, 2-ethoxynaphthalene-1 - sulfonyl chloride, 1-ethoxynaphthalene-4-sulfonyl chloride, 2-methoxynaphthalene-3-sulfonyl chloride, 2-methoxynaphthalene-6-sulfonyl chloride, 2 - ethoxynaphthalene - 6 - sulfonyl chloride, 2-ethoxynaphthalene-7-sulfonyl chloride, 2-methoxynaphthalene-8-sulfonyl chloride, 2-ethoxynaphthalene -8 -sulfonyl chloride, 2 - methoxybenzenesulfonyl chloride, 2-ethoxybenzenesulfonyl chloride, 3-methoxybenzenesulfonyl chloride, 3-ethoxybenzenesulfonyl chloride, 3-n-propoxybenzenesufonyl chloride, 4 - methoxybenzenesulfonyl chloride, 4-ethoxybenzenesulfonyl chloride, 4 - n - propoxybenzenesulfonyl chloride, 4-n-butoxybenzenesulfonyl chloride, 4-methyl - 2 - methoxybenzenesulfonyl chloride, 3-methyl-2-methoxybenzenesulfonyl chloride, 4-methyl - 3 - methoxybenzenesulfonyl chloride, 4 - methyl - 3 - ethoxybenzenesulfonyl chloride, 2 - methyl - 3 - methoxybenzenesulfonyl chloride, 2 - methyl - 6 - methoxybenzenesulfonyl chloride, 3 - methyl - 5 - methoxybenzenesulfonyl chloride, 3 - methyl - 4 - methoxybenzenesulfonyl chloride, 3 - methyl - 4 - ethoxybenzenesulfonyl chloride, 3-methyl-4-n-butoxybenzenesulfonyl chloride, 2-methyl-4-methoxybenzenesulfonyl chloride, 2-methyl-4-ethoxybenzenesulfonyl chloride, 2-n-propyl-4-ethoxybenzenesulfonyl chloride, 2-methyl-5-methoxybenzenesulfonyl chloride, 2-methyl-5-ethoxybenzenesulfonyl chloride, 5-methyl-2-methoxybenzenesulfonyl chloride, 5-methyl-2-ethoxybenzenesulfonyl chloride, 5 - methyl-n-propoxybenzenesulfonyl chloride, 5-n-propyl-2-methoxybenzenesulfonyl chloride and 5-n-propyl-2-ethoxybenzenesulfonyl chloride.

Disulfonyl chlorides derived from aryl-alkyl ethers can also be used to prepare such sulfonamides. Examples of these disulfonyl chlorides include (F) 2-ethoxynaphthalene-1,6-disulfonyl chloride, 2-ethoxynaphthalene-3,6-disulfonyl chloride, 2-ethoxynaphthalene-6,8-disulfonyl chloride, 1-methoxybenzene-2,4-disulfonyl chloride, 1-ethoxybenzene-2,5-disulfonyl chloride, 1-ethoxybenzene-2,4-disulfonyl chloride and 1-methyl-3-methoxybenzene-4,6-disulfonyl chloride.

Alkanesulfonyl chlorides are produced less readily than are the corresponding aromatic compounds. However, alkanesulfonyl chlorides (from which can be produced alkanesulfonamides, as hereinbefore described) can be produced by means of a reaction between an alkanesulfonic acid and phosphorus pentachloride. The alkanesulfonic acids are well known and their properties have been determined.

In the practice of the invention a sulfonamide first may be dissolved in an aqueous solution of a strong base. Epichlorohydrin is then added to the solution. Exothermic reaction usually proceeds at room temperature, but it is ordinarily desirable to heat the mixture (usually to a temperature not higher than about 100° C.). Separation of an oily layer from the water solution indicates resin formation. It is desirable to reflux the mixture for a short period of time (e. g., about 30 minutes) after the exothermic reaction is complete. The resin is then separated from the water layer, e. g., by decantation or in a separatory funnel. The resin is next washed with water (preferably hot water). In some instances it is desirable to wash the resin with an acid before the water wash. The resin is dried by heating on a hot plate while a stream of air or other gas is bubbled through it. The dried resin can be modified by reaction with such materials as linseed oil acids, phthalic anhydride, eleostearic acid, acetic anhydride, dicarboxylic acids, isocyanates and di-isocyanates, as hereinbefore described. This modification is accomplished by heating a mixture of the resin and the modifying agent until the mixture has a viscosity within a predetermined range (e. g., when diluted to 49 per cent solids with a mineral spirits solvent such as "Amsco C," hereinafter described, has a Gardner-Holt viscosity of about F). In some instances it is desirable to incorporate in the resin a small amount of a metallic drier, e. g., cobalt naphthenate, if the modified resin is air drying.

As is indicated by Equations 1 and 2, above, it is believed that epichlorohydrin and a monosulfonamide participate in the reaction of the invention in a 1:1 molar ratio. Epichlorohydrin and a compound containing two unsubstituted sulfonamide groups are thought to react in a 2:1 molar ratio, i. e., 1 gram mol of epichlorohydrin reacts for every 2 gram atoms of hydrogen attached to sulfonamide nitrogen atoms in the sulfonamide molecule. Therefore, epichlorohydrin and a disulfonamide in which two of the sulfonamide hydrogens have been replaced by other radicals (i. e., aliphatic or aromatic radicals, as hereinbefore described) participate in the reaction in the same ratio as epichlorohydrin and a monosulfonamide, i. e., in a 1:1 molar ratio. Epichlorohydrin and a disulfonamide in which one of the sulfonamide hydrogens (i. e., a hydrogen attached to the nitrogen atom in a sulfonamide group) has been replaced by another radical participate in the reaction in a 1.5:1 molar ratio. Reaction of a small excess of either ingredient is believed to limit the average length of the molecular chains formed by the reaction of the invention. The reaction is thought to proceed until so many of the reactive points are derived from the substance reacting in more than the ratio indicated above that further reaction does not occur. An inverse relationship is believed to obtain between the average molecular weight of the resin and the amount of the excess of either ingredient that has reacted, i. e., when a larger excess of either ingredient has reacted the average molecular weight of the resin is smaller, the maximum molecular weight being achieved by reaction of approximately the theoretical quantities indicated above. For economic reasons, as well as because it is usually desirable that resins of comparatively high molecular weight be formed, it is preferable that epichlorohydrin and the sulfonamide be reacted in approximately the theoretical proportions, it usually being desirable that any excess be epichlorohydrin. However, it has been found that satisfactory resins can be produced in the practice of the invention using as little as 0.5 mol of epichlorohydrin for every two gram atoms of hydrogen, and that satisfactory resins can be produced using as much as three mols of epichlorohydrin for every two gram atoms of hydrogen, although it is ordinarily not desirable to use more than about two mols of epichlorohydrin for two gram atoms of hydrogen.

Epichlorohydrin and a sulfonamide can be reacted by simply mixing them and adding a basic material. However, if a base (such as pyridine) which is miscible with the sulfonamide-epichlorohydrin mixture is used the reaction does not produce the desired resins. It is believed that the product of such a reaction is a simple, monomeric, substituted amide; such product is soluble in an aqueous solution of a strong base, but becomes insoluble after reaction (which produces the desired resins) in such medium for a short period of time. For this reason it is desirable to conduct the reaction of the invention in the presence of a strong base such as sodium hydroxide, potassium hydroxide, or any quaternary ammonium hydroxide such as trimethylbenzyl ammonium hydroxide. It is most convenient to introduce the strong base as an aqueous solution; if sufficient base is used the sulfonamide goes into solution readily; in most instances, the sulfonamide and the epichlorohydrin both go into solution after a short time (the solution is believed to prevail while the product of the reaction is monomeric in form, i. e., has a formula corresponding to that representing the product of Equation 1, above); and then the resin begins to precipitate from the solution. Equation 2 indicates that epichlorohydrin and the base react in a 1:1 molar ratio. In some instances, qualitative tests on resins produced by the reaction of the invention using a molar ratio of epichlorohydrin to base greater than 1:1 indicate the presence of chlorine in these resins; this is thought to indicate the presence of units derived from a reaction corresponding to that represented by Equation 1, above. It is usually desirable that the reaction be conducted in the presence of an amount of a strong base that is not more than approximately equivalent to the amount of epichlorohydrin reacted (i. e., one equivalent of the strong base for each mol of epichlorohydrin). It has been found that the reaction can be conducted with satisfactory results when a considerable excess of epichlorohydrin is used (i. e., as much as two mols of epichlorohydrin per equivalent of the strong base), but is usually preferable that from about 1¼ to about 1½ mols of epichlorohydrin be use per equivalent of strong base. Conducting the reaction in the presence of a large amount of a strong base yields a product having a comparatively high pH; since the more stable resins are those having a relatively low pH, it is desirable to use the least amount of strong base that gives a satisfactory product.

The reaction of the invention is exothermic in nature and has been found to proceed at temperatures as low as about 25° C., usually causing an increase in temperature. It is ordinarily desirable that the reaction be conducted at temperatures not substantially greater than 100° C. It is usually preferable that the reaction be conducted at temperatures of at least about 40° C., and it is ordinarily preferable that the mixture of reactants be maintained at a temperature not substantially higher than 75° C.

The resins produced from a monosulfonamide and epichlorohydrin may be washed with either an aqueous acid or water alone until the washings are found to be free of chlorine (e. g., by testing them with silver nitrate). The resins from disulfonamides and epichlorohydrin may be washed with an aqueous acid and then with water until the washings are found to be free of chlorine. The washed resins may be dried by heating them and, at the same time, bubbling a stream of heated air or other gas through the resins. Nitrogen or carbon dioxide may be used in place of the air.

When it is desired to modify the resins produced by the reaction of the invention they are mixed with one of the modifying agents hereinbefore described. It is usually desirable to use at least about 5 weight per cent (based upon the amount of resin and modifying agent), and it is ordinarily preferable to use at least about 20 weight per cent of the modifying agent. Ordinarily it is not advisable to use more than about 50 weight per cent of the modifying agent, and it is usually preferable to use not more than about 30 weight per cent of the modifying agent. The mixture is heated (e. g., at a temperature between about 225° C. and about 275° C.) until it has such a viscosity that it can be conveniently used for coating purposes. This viscosity is usually such that a sample of the resin diluted to about 40 weight per cent solids with a mineral spirits solvent has a Gardner-Holt viscosity between about C and about I. The modified resin is then cooled and diluted to about 50 per cent solids with a solvent (such as an aromatic petroleum fraction; for example, "Amsco C," which is one containing 68 weight per cent of aromatic hydrocarbons, 10 weight per cent of naphthalenes and 17 weight per cent of paraffins, having a specific gravity of about 0.82 and a distillation range from about 250° F. to about 320° F.). When an air-drying resin is prepared (i. e., by modifying the resin of the invention with materials such as linseed oil acids, eleostearic acid and other less unsaturated acids), it is often desirable to incorporate in the resin a metallic drier. The metallic driers that are ordinarily used with air-drying resins are salts of cobalt, iron, copper, manganese, chromium, calcium, nickel or lead, preferably naphthenate salts. Other salts of the metals listed above (if soluble in the resin) may be used, e. g., resinates, linoleates or other salts of unsaturated fatty acids. A very small amount (e. g., from about 0.01 to about 0.1 weight per cent) of a drier is usually sufficient to give a reasonably rapid-drying composition.

*Example 1*

A fusible (i. e., thermoplastic) resin is prepared by means of a reaction between epichlorohydrin and a monosulfonamide according to the following procedure: A monosulfonamide (17.0 grams of p-toluene sulfonamide) is dissolved in an aqueous solution of a strong base (4.0 grams of sodium hydroxide in 50 cc. of water) and epichlorohydrin (10.5 grams) is added. The mixture is prepared from ingredients having a temperature of about 25° C. and is allowed to stand, with intermittent shaking, at room temperature (about 25° C.). The epichlorohydrin dissolves gradually and exothermic reaction causes the temperature of the mixture to reach a maximum of about 45° C. As the reaction proceeds an oily layer (resin phase) separates from the water solution. The reaction is allowed to proceed (with intermittent shaking) for from about 3 to about 4 hours, after which time the oily layer is separated (e. g., by decantation or in a separatory funnel) from the water phase. The separated resin is washed with hot water until the washings are free from chloride (as indicated by tests of silver nitrate) and is dried, by heating on a steam bath, to yield 20 grams of a soft viscous resin.

By way of comparison p-toluene sulfonamide (17.1 grams) and epichlorohydrin (9.3 grams) are mixed and heated to 120° C. The mixture melts but, apparently, no reaction takes place. When, however, p-toluene sulfonamide (1.7 grams) and epichlorohydrin (0.9 grams) are mixed and one drop of pyridine is added to the mixture which is then heated to 120° C., exothermic reaction causes the temperature of the mixture to rise to about 130° C. The product of the reaction is cooled and is dissolved in 10 weight per cent aqueous sodium hydroxide solution (4.0 grams), and the resulting solution is heated until it boils gently. After the solution has boiled gently for a few minutes an oily resinous phase separates from the aqueous phase.

The procedure of the first paragraph of the example is repeated except that the quantities of p-toluene sulfonamide, aqueous sodium hydroxide and epichlorohydrin are 51 grams, 24 grams in 200 cc. of water and 29 grams, respectively; the mixture is heated to about 60° C. at which temperature heating is discontinued; exothermic reaction of the invention causes the temperature of the liquid to rise to about 80° C.; the liquid is cooled to avoid temperatures higher than 80° C.; and the mixture is refluxed gently for about 30 minutes after the exothermic reaction has ceased. The separated and washed resin is dried by heating it on a hot plate at about 100° C.; air is bubbled through the liquid until the last traces of water are vaporized. The dried resin is light tan in color, is soluble in dioxane and acetone but insoluble in xylene and toluene, and has a softening point between about 84° C. and about 90° C.

The procedure of the preceding paragraph of the example is repeated except that the quantity of epichlorohydrin used is 55 grams instead of 29 grams. The washed resin is dried by heating it to a temperature of about 150° C. The dried resin is light tan in color. Sulfuric acid (about ¼ gram of 98 per cent sulfuric acid) is added to the resin, and the acid-resin mixture is heated for about 6 hours at 155° C. The resin darkens during this heating but remains soluble in acetone and does not gel or thicken appreciably. A drop of this resin, when heated on a hot plate, does not cure. If about 10 weight per cent of a di-isocyanate such as diphenylmethane 4,4'-diisocyanate is mixed with this resin a drop of the mixture fuses when heated on a hot plate and then hardens. The resin is compatible with cellulose acetate but not with rosin or ester gum.

*Example 2*

A fusible resin is prepared by a procedure that is the same as that described in the first paragraph of Example 1 except that 20 cc. of 20 weight per cent aqueous sodium hydroxide diluted with 200 cc. of water and 9.2 grams of epichlorohydrin are used, and benzene sulfonamide (15.7 grams) is used instead of the p-toluene sulfonamide. The mixture is warmed, with shaking, to about 40° C. Heating is discontinued and exothermic reaction causes the temperature of the mixture to rise to about 50° C. The mixture is then placed on a steam bath until the reaction is substantially complete (about 3 hours after heating on the steam bath is started). The washed resin is dissolved in dioxane (about 500 cc.), and the dioxane solution is poured into dilute aqueous acid (about 700 cc. of about 10 per cent HCl). The resinous phase separates from the toluene solution and is isolated by decantation or in a separatory funnel. The resulting product is insoluble in an aqueous base (10 weight per cent sodium hydroxide). A drop of the resin on a hot plate does not cure. When a mixture of the resin with about 10 weight per cent of a di-isocyanate is prepared a drop of this mixture gels on the hot plate. The resin is compatible with cellulose acetate but not with rosin or ester gum.

*Example 3*

N,N'-di-n-butyl diphenyl ether disulfonamide (15 grams) is dissolved in aqueous sodium hydroxide (2.8 grams in 20 cc. of water). The solution is heated to about 60° C., and epichlorohydrin (6.4 grams) is added, with stirring, to the heated solution. The stirred mixture is held at about 70° C. until approximately 20 minutes after the epichlorohydrin addition was started. The oily resin layer is separated (e. g., by decantation or in a separatory funnel) from the water phase, and the separated resin is washed with hot water, then with dilute HCl (about 15 weight per cent) and again with hot water. The fusible resin is dried by heating on a hot plate until all the water is vaporized.

The procedure of the preceding paragraph is repeated except that the caustic solution (12.2 grams of NaOH in 87 cc. of water) is used to dissolve 65 grams of N,N'-di-n-butyl diphenyl ether disulfonamide, and that the epichlorohydrin added amounts to 28 grams. The product recovered is a light colored, solid, brittle resin (78 grams). This resin is converted to an air-drying resin by mixing it with rosin (17.4 grams) and distilled linseed oil acids (87 grams) and heating to about 250° C. while stirring by means of carbon dioxide which is bubbled into the mixture. Heating is continued until a sample of the resin diluted to about 40 weight per cent solids with a solvent such as "Amsco C" has a Gardner-Holt viscosity of F. The resin is then cooled and diluted to about 50 weight per cent solids with a solvent such as "Amsco C." The resin has an acid number of 7.7 and can be used to produce air-drying films.

A procedure that is the same as that described in the preceding paragraph is used to produce a fusible resin, using (instead of the N,N'-di-n-butyl diphenyl ether disulfonamide) 15 grams of N,N'-diallyl diphenyl ether disulfonamide, 2.96 grams of sodium hydroxide in 17 cc. of water and 6.8 grams of epichlorohydrin. A sample of the dark red, infusible resin (8.8 grams) is converted to an air-drying resin by a procedure that is the same as that described above using 9.8 grams of distilled linseed oil acids and 1.9 grams of rosin.

*Example 4*

A fusible resin is prepared by a procedure that is the same as that described in the first paragraph of Example 3 except that the ingredients used are cyclohexane sulfonamide (3.26 grams), aqueous sodium hydroxide (0.8 grams in 21.3 cc. of water) and epichlorohydrin (1.84 grams), and the resulting mixture is held at about 55° C. for about five minutes and then held at a temperature between about 80° C. and about 85° C. for an additional five minutes. The separated resin is washed and dried by heating on a hot plate at about 100° C. until the last traces of water are vaporized. The dried resin is a light colored brittle solid.

The procedure of the preceding paragraph is repeated using 3.68 grams of epichlorohydrin. The dried product is a soft resinous mass.

Having described the invention, I claim:

1. A method of producing a synthetic resin that comprises reacting epichlorohydrin at a sulfamine radical in a sulfonamide whose molecule has at least two hydrogen atoms each connected to a sulfonamide nitrogen atom, in a ratio of from 0.5 to 3 molecules of epichlorohydrin for two sulfonamide hydrogen atoms, the reaction being carried out in an aqueous solution of ½ to 1 equivalents of a strong base for each mol of epichlorohydrin.

2. A method of producing a synthetic resin that comprises reacting epichlorohydrin at a sulfamine radical in a sulfonamide whose molecule has at least two hydrogen atoms each connected to a different sulfonamide nitrogen atom, in a ratio of from 0.5 to 3 molecules of epichlorohydrin for two sulfonamide hydrogen atoms, the reaction being carried out in an aqueous solution of ½ to 1 equivalents of a strong base for each mol of epichlorohydrin.

3. A method of producing a synthetic resin that comprises reacting epichlorohydrin at a sulfamine radical in a sulfonamide whose molecule has at least two sulfonamide nitrogen atoms each connected to a hydrogen atom and a monovalent hydrocarbon radical, in a ratio of from 0.5 to 3 molecules of epichlorohydrin for two sulfonamide hydrogen atoms, the reaction being carried out in an aqueous solution of ½ to 1 equivalents of a strong base for each mol of epichlorohydrin.

4. A method of producing a synthetic resin that comprises reacting epichlorohydrin at a sulfamine in a sulfonamide whose molecule has at least two sulfonamide nitrogen atoms each connected to a hydrogen atom and an alkyl radical, in a ratio of from 0.5 to 3 molecules of epichlorohydrin for two sulfonamide hydrogen atoms, the reaction being carried out in an aqueous solution of ½ to 1 equivalents of a strong base for each mol of epichlorohydrin.

5. A method of producing a synthetic resin that comprises reacting epichlorohydrin with N,N'-din-butyl diphenyl ether 4,4'-disulfonamide, in a molar ratio of epichlorohydrin to N,N'-di-n-butyl diphenyl ether 4,4'-disulfonamide from 0.5:1 to 3:1, the reaction being carried out in an aqueous solution of ½ to 1 equivalents of a strong base for each mol of epichlorohydrin.

6. A method of producing a synthetic resin that comprises reacting epichlorohydrin at a sulfamine radical in a sulfonamide whose molecule has at least two hydrogen atoms each connected to a sulfonamide nitrogen atom, in a ratio of from 0.5 to 3 molecules of epichlorohydrin for two sulfonamide hydrogen atoms, the reaction being carried out in an aqueous solution of ½ to 1 equivalents of a strong base for each mol of epichlorohydrin, and then esterifying free hydroxy radicals in the reaction product with an esterifying agent of the class consisting of carboxylic acids and isocyanates.

7. An epichlorohydrin-sulfonamide condensation polymer wherein the epichlorohydrin constituent (1) has the formula

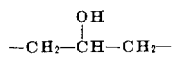

and (2) forms a bridge in the polymer chain directly connecting two sulfonamide nitrogen atoms by replacement of a hydrogen atom on each of such nitrogen atoms, there being at least two such replaceable hydrogen atoms in each sulfonamide molecule.

8. An epichlorohydrin-disulfonamide condensation polymer wherein the epichlorohydrin constituent (1) has the formula

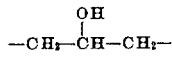

and (2) forms a bridge in the polymer chain directly connecting two sulfonamide nitrogen atoms in two different disulfonamide molecules by replacement of a hydrogen atom on each of such nitrogen atoms, there being at least two such replaceable hydrogen atoms connected to different sulfonamide nitrogen atoms in each sulfonamide molecule.

9. An epichlorohydrin-disulfonamide condensation polymer as claimed in claim 8 wherein each of the sulfonamide nitrogen atoms in the disulfonamide has a monovalent hydrocarbon radical directly connected thereto.

10. An epichlorohydrin-disulfonamide condensation polymer as claimed in claim 8 wherein the disulfonamide is a N,N'-dialkyl disulfonamide.

11. An epichlorohydrin-disulfonamide condensation polymer as claimed in claim 8 wherein the disulfonamide is N,N'-di-n-butyl diphenyl ether 4,4'-disulfonamide.

12. A carboxylic acid ester of an epichlorohydrin-sulfonamide condensation polymer claimed in claim 7.

JOHN KENSON SIMONS.

References Cited in the file of this patent

UNITED STATES PATENTS

| Number | Name | Date |
| --- | --- | --- |
| 2,076,624 | DeGroote | Apr. 13, 1937 |
| 2,085,706 | Schoeller et al. | June 29, 1937 |
| 2,089,569 | Orthner et al. | Apr. 10, 1937 |
| 2,510,886 | Greenlee | June 6, 1950 |

FOREIGN PATENTS

| Number | Country | Date |
| --- | --- | --- |
| 506,999 | Great Britain | June 5, 1939 |

Certificate of Correction

Patent No. 2,643,244 — June 23, 1953

JOHN KENSON SIMONS

It is hereby certified that error appears in the printed specification of the above numbered patent requiring correction as follows:

Column 1, line 40, for "beacuse" read *because*; column 3, lines 51 to 54, for that portion of the formula reading

column 6, line 59, for "ankyl-aryl" read *alkyl-aryl*; column 9, line 14, for "2-ethylbenzenesulfony" read *2-ethylbenzenesulfonyl*; column 11, line 46, for "49 per cent" read *40 per cent*; column 13, line 3, for "use" read *used*; column 16, line 66, before "in" insert *radical*;

and that the said Letters Patent should be read as corrected above, so that the same may conform to the record of the case in the Patent Office.

Signed and sealed this 29th day of September, A. D. 1953.

[SEAL]

ARTHUR W. CROCKER,
*Assistant Commissioner of Patents.*